United States Patent [19]

Philby et al.

[11] Patent Number: 5,227,098
[45] Date of Patent: Jul. 13, 1993

[54] LASER DRILLING

[75] Inventors: Jonathon D. Philby, Ilkely; Glyndwyr J. Davies, Dunchurch, both of United Kingdom

[73] Assignee: AE Turbine Components Limited, Leads, England

[21] Appl. No.: 688,138

[22] Filed: Apr. 22, 1991

[30] Foreign Application Priority Data

Apr. 26, 1990 [GB] United Kingdom ............... 9009343

[51] Int. Cl.$^5$ ............... B29C 45/00; C08F 259/00; H05B 6/00
[52] U.S. Cl. ............... 264/25; 264/267; 264/331.14
[58] Field of Search ............... 264/331.14, 25, 267; 525/276

[56] References Cited

U.S. PATENT DOCUMENTS

| 4,539,463 | 9/1965 | Piccioli et al. | 264/25 |
| 4,803,021 | 2/1989 | Werth et al. | 264/25 |
| 4,904,529 | 2/1990 | Ikegaya | 525/276 |
| 4,954,256 | 9/1990 | Degen et al. | 525/276 |
| 5,069,833 | 12/1991 | Yokoi et al. | 264/25 |

FOREIGN PATENT DOCUMENTS 218476 4/1988 Japan ............... 525/276

*Primary Examiner*—Jacob Ziegler
*Attorney, Agent, or Firm*—Nixon & Vanderhye

[57] ABSTRACT

A material is described for preventing the occurrence of damage to the backwall of a cavity within a component during laser drilling of holes into said component. The material comprises an acrylic resin having polytetrafluoroethylene dispersed within it. A method for preventing such backwall damage occurring during laser drilling using this material is also described.

5 Claims, 1 Drawing Sheet

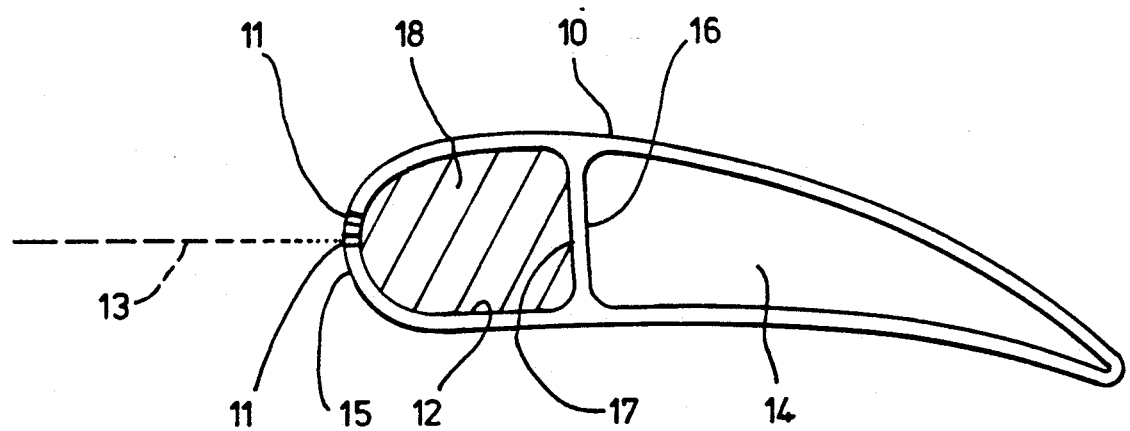

LASER DRILLING

BACKGROUND OF THE INVENTION

This invention relates to the drilling of holes, using laser radiation into components having an internal cavity.

Laser radiation is often used for the precision drilling of small holes in components used, for example, in the aerospace industry.

Two methods for producing such holes with laser radiation are available; direct drilling and trepanning. Direct drilling involves the use of a "pulsed" laser wherein material is removed little by little by individual pulses of laser radiation concentrated on a small area. The general technique involves directing a number of pulses of laser radiation to burn through the material plus one or more subsequent pulses to "clean out" the interior of the hole and to remove the rough edges left on the hole as the laser emerges through the material.

Trepanning involves direct drilling of a small hole through the material which is then enlarged by moving the laser source and the component relative to one another such that the edges of the hole are gradually removed. During this enlargement process a significant proportion of the energy derived from the laser passes straight through the hole made and is not incident upon the material it is desired to remove.

When drilling holes, by either of the above methods, into components having an internal cavity, a major problem is the prevention of damage to the internal back wall of the cavity upon break through by the laser beam. Such damage is especially prevalent when drilling by the trepanning method during which, only around 50% of the laser energy is incident on the material being removed, the majority of the rest of the energy passing down the already drilled hole which acts as a "light pipe", maintaining a constant beam width and so tending to maximise the backwall damage.

It is known to use paraffin wax containing up to 60% by weight PTFE as a "laser-stopper" material to fill the cavity of such components prior to laser drilling. Such PTFE-filled wax disperses the laser energy incident upon it and thereby prevents or reduces damage to the cavity backwall. However, problems associated with the use of PTFE-filled wax are that the wax tends to melt as the component heats up and may drip out of the holes already drilled; since laser drilling is often carried out in an oxygen-rich atmosphere the wax is prone to burning as it drips out of the component. Furthermore such waxes also tend to leave a carbon-rich deposit or "char" on the component which may chemically combine with the remelted metal at the hole edges and can lead to cracking and general weakening of the component.

It is an object of the present invention to provide an improved cavity filling material, for use in the laser drilling of holes in components having internal cavities, to minimise damage occurring to the backwall of the cavity when the laser beam breaks through the component surface.

It is a further object to minimise the other undesirable chemical side effects which occur with known filling materials.

BRIEF DESCRIPTION OF THE DRAWING

FIG. 1 is a cross-sectional view showing a turbine blade being laser drilled in accordance with the invention.

DETAILED DESCRIPTION OF THE INVENTION

According to a first aspect of the present invention there is provided a material for use in the laser drilling of components each defining at least one internal cavity therein, the material acting to minimise damage occurring to a backwall of the cavity due to the laser beam, said material comprising an acrylic resin monomer and polytetrafluoroethylene (PTFE), the monomer incorporating a suitable initiator to promote polymerisation of the liquid monomer to form a solid polymer.

In one embodiment of the material the acrylic resin monomer may preferably comprise methylmethacrylate (MMA).

The resulting polymethylmethacrylate (PMMA) has many advantageous features for the purposes of the present invention; it leaves little or no char on degradation, it has a relatively high melting point and a low oxygen index and therefore does not tend to melt and drip out of the component during drilling or to burn in an oxygen-rich atmosphere. Furthermore PMMA has good powers of dispersion to laser light and also acts as a type of "fibre optic", that is to say PMMA lights up when the laser light hits it; this feature is useful in detecting breakthrough of the laser into the cavity.

The proportion of PTFE dispersed in the resin may range from very low levels of less than 0.5% by weight to very high levels of over 70% by weight but is effectively determined by the accessibility of the internal cavity in the particular component to be drilled and the ease with which the filler may be introduced. Increasing the proportion of PTFE in the mixture also increases its viscosity hence high PTFE contents may not be suitable for use when drilling components having very small and/or complex cavities to which access is limited.

For the purposes of the present invention the PTFE is preferably present in the range 0.5% by weight to 30% by weight, more preferably 1% by weight to 10% by weight and still more preferably 2% by weight to 6% by weight.

The initiator used to promote polymerisation of the liquid monomer may be any free radical initiator known in the art for such purposes. Examples of such initiators include azobisisobutyronitrile and peroxides.

According to a second aspect of the present invention a method for preventing damage to an internal backwall of a cavity defined within a component during laser drilling of holes into said component comprises the steps of at least partially filling the cavity in the component with a material comprising an acrylic resin monomer and polytetrafluoroethylene (PTFE), the monomer incorporating a suitable initiator to promote polymerisation, and allowing said material to polymerise in situ in the cavity prior to laser drilling.

The invention will now be described more particularly by means of the following Example and drawing which shows a section through a turbine blade being laser drilled in accordance with the invention.

DETAILED DESCRIPTION OF THE DRAWING

In the drawing the turbine blade 10 has two simple internal cavities, a front cavity 12 and a rear cavity 14 separated by an internal wall 16 the front face 17, of which forms the backwall of the front cavity 12. Holes 11 are produced in the front surface, 15 of the blade by means of pulses of radiation 13, incident upon the blade front produced by a laser (not shown). The front cavity 12 is completely filled with a material 18, which acts to disperse the laser energy after it breaks through the front surface and thereby prevent or minimise any damage to the backwall 17.

EXAMPLE

A turbine blade to be laser drilled contained a complex cavity, from the root almost to the top, 70 mm long tapering down to a small cross-sectional area of approximately 2 mm$^2$. Numerous pillars spanned the cavity thereby making the use of a solid PTFE laser barrier impossible.

The barrier material comprised 19 g of methyl methacrylate, 1.0 g of Fluon L169 (trade mark) PTFE powder and 0.5 g of azobisisobutyronitrile. These components were stirred together for 30 seconds and drawn into a syringe to which a 1 mm diameter flexible tube was then attached to direct the liquid to the bottom of the blade cavity. The blade was filled, in the upright position, to overflowing.

After one hour the barrier material had set and the blade could be handled; after 24 hours at ambient temperatures the blade was ready for drilling.

Drilling was carried out using a Nd-YAG (1064 nm) pulsed laser using oxygen gas fed through an axial jet to the turbine blade surface to assist molten metal and vapour removal.

The following laser parameters were used:

| | |
|---|---|
| Nozzle to workpiece gap = | 10 mm |
| O$_2$ pressure = | 100 psi |
| Lens setting = | 50 mm |
| Energy per pulse = | 12 Joules |
| Pulse width = | 0.6 msec |
| Lamp power = | 3 Kw (×2) |

After drilling was completed the barrier material was removed from the blade by burning out in a furnace at 700° C. for 3 hours. Examination of the blade showed that good hole shape and quality had been obtained with no damage to the backwall of the blade cavity and no chemical reaction between the filling material and the metal adjacent to the hole walls.

We claim:

1. A method for preventing damage to an internal backwall of a cavity defined within a component, during laser drilling of holes into said component, the method comprising the steps of:
   (a) at least partially filling the cavity in the component with a material comprising a mixture of polytetrafluoroethylene dispersed in an acrylic resin monomer together with an initiator to promote polymerization of the monomer, and
   (b) allowing said material to polymerize in situ in the cavity prior to laser drilling.

2. The method according to claim 1 wherein the acrylic resin monomer is methylmethacrylate.

3. The method according to claim 2 wherein the polytetrafluoroethylene is present in the range 0.5% by weight to 30% by weight.

4. The method according to claim 3 wherein the polytetrafluoroethylene is present in the range 1% by weight to 10% by weight.

5. The method according to claim 3 wherein the polytetrafluoroethylene is present in the range 2% by weight to 6% by weight.

* * * * *